July 8, 1969          F. M. ERNSBERGER          3,454,386
METHOD FOR MAKING RADIATION INDUCED CRYSTALLIZED GLASS
Filed Jan. 13, 1965
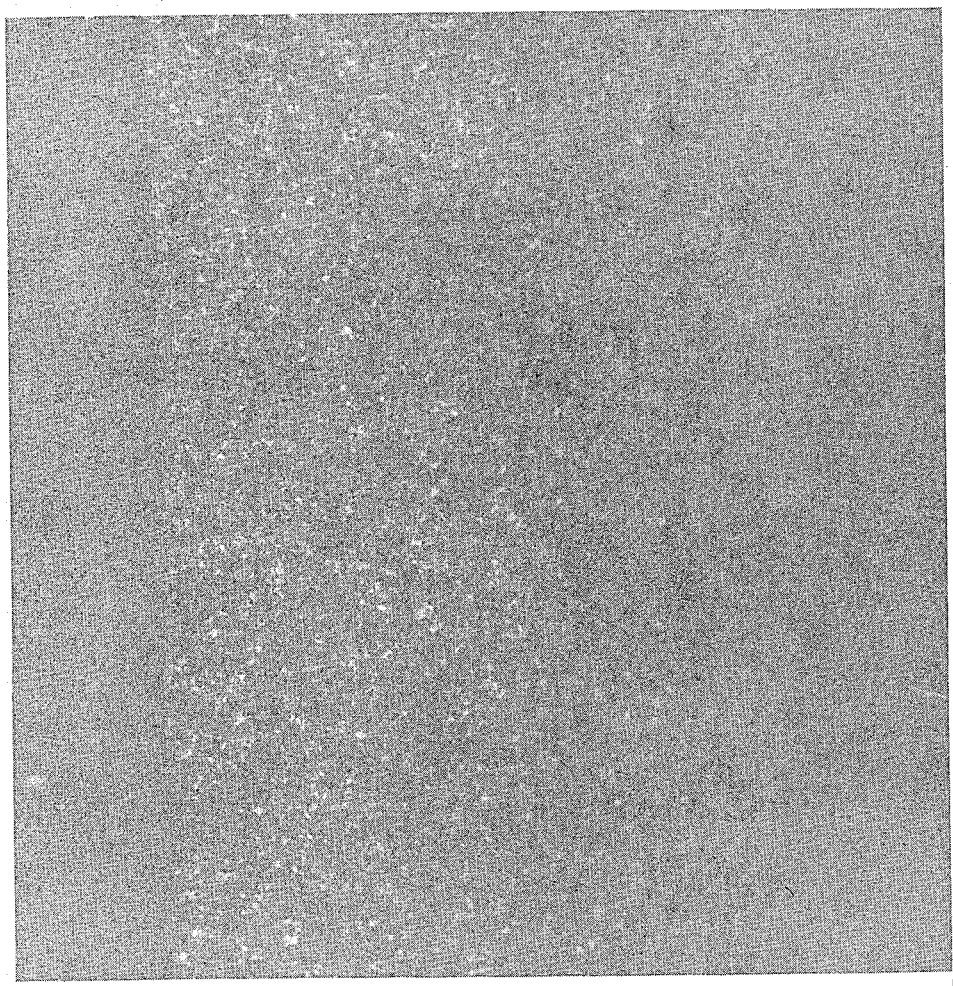
GLASS SURFACE
GLASS INTERIOR
FIG. 1
INVENTOR
FRED M. ERNSBERGER
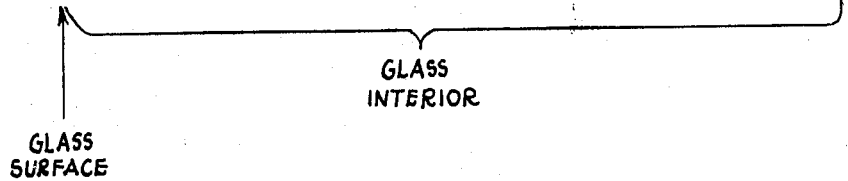
ATTORNEYS

United States Patent Office 3,454,386
Patented July 8, 1969

3,454,386
METHOD FOR MAKING RADIATION INDUCED CRYSTALLIZED GLASS
Fred M. Ernsberger, Pittsburgh, Pa., assignor to PPG Industries, Inc., a corporation of Pennsylvania
Filed Jan. 13, 1965, Ser. No. 425,138
Int. Cl. C03c *3/22, 21/00, 23/00*
U.S. Cl. 65—33                    9 Claims

ABSTRACT OF THE DISCLOSURE

This invention relates to novel strengthened articles and to a method of producing such articles by surface crystallization of glass materials. This invention especially relates to strengthened glass articles wherein the surface portions of the glass contain randomly-oriented silica-O crystals and the crystallizable glass base contains titanium dioxide and a metal such as silver, gold, copper, or platinum. More particularly, this invention relates to a novel method of nucleating surface portions of a crystallizable glass article by means of high-energy radiation, especially electron radiation.

---

Figure 2:
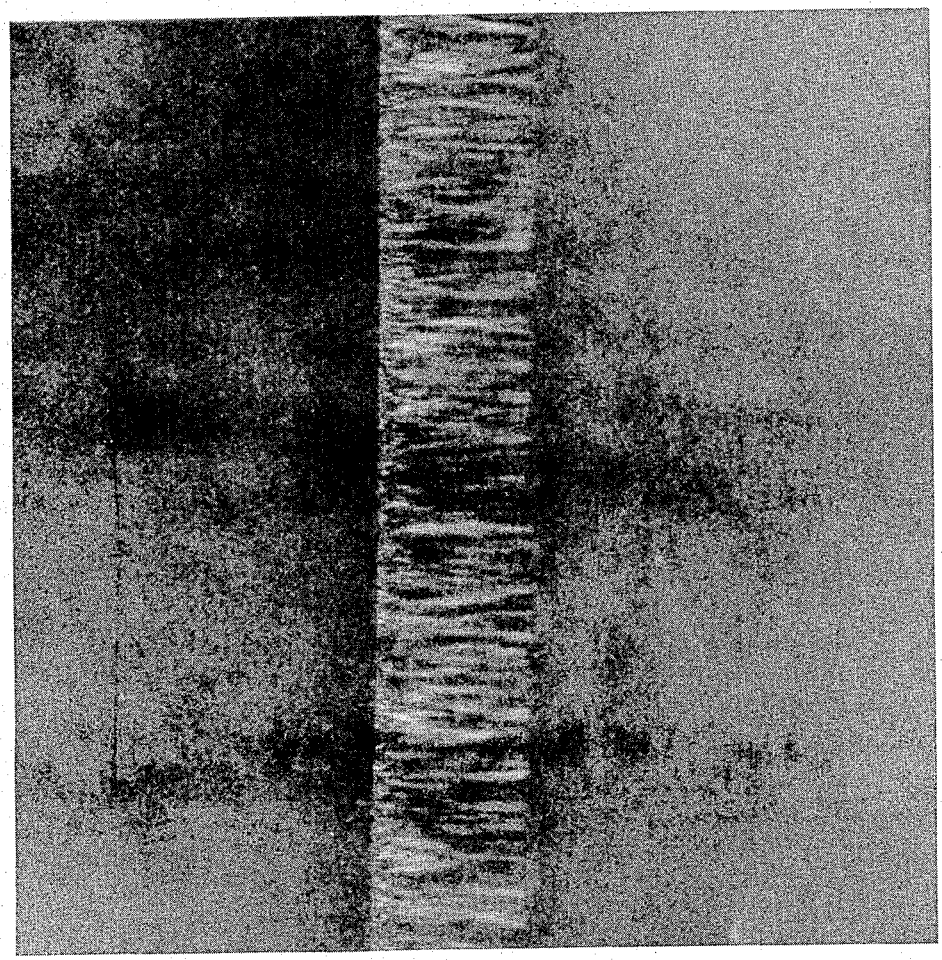

It is known that certain specific glass compositions are able to produce crystals of β-spodumene $$(Li_2O \cdot Al_2O_3 \cdot 4SiO_2)$$

in the glass surface through ion exchange techniques. The development of this crystal reduces the average coefficient of thermal expansion exhibited by the glass-crystal combination in the surface region of the glass. The lower coefficient of thermal expansion results in a surface compressive stress, which increases the strength of the glass article. This process is illustrated in U.S. Patent No. 2,779,136 issued to Harrison P. Hood et al.

Crystallization not in conjunction with ion exchange techniques has also been suggested. Belgian Patent No. 576,259 discloses a method of heat treating a lithia-alumina-silica base glass composition to produce crystallization. The method described results in crystalline growth throughout the entire thickness of the glassy matrix, converting the glass article into a complex of crystals and glass wherein the crystals are substantially uniformly dispersed in and throughout the entire glassy matrix. The increase in the strength of glass realized by this treatment is not in excess of the strength improvement realized in ordinary tempering operations commonly in commercial use. This result is not surprising since no surface compression results from uniform crystallization throughout the entire thickness of the article.

Another method of strengthening glass articles utilizing crystallization techniques involves the carefully controlled heat treatment over a long period of time of a lithia-alumina-silica glass having approximately the same composition as the β-eucryptite crystal $$(Li_2O \cdot Al_2O_3 \cdot 2SiO_2).$$

This composition may also contain a certain amount of a nucleating agent, such as $TiO_2$. The β-eucryptite crystal developed exhibits a low coefficient of thermal expansion, and when present in only the surface portions of a glass article develops a state of high surface compressive stress. This procedure is illustrated in U.S. Patent No. 2,998,675.

In copending application Ser. No. 376,544 filed June 19, 1964, by Jean P. Pressau, now abandoned, there is disclosed a method of producing surface crystallization using a thermal gradient technique. The glass composition disclosed therein when subjected to the thermal gradient heat treatment develops crystals of silica-O in and near the surface zones of the glass article. The silica-O, since they exhibit a lower coefficient of thermal expansion than the base glass composition, develop a surface compressive zone which increases the strength of the glass article. The silica-O crystals are nucleated at the surface and at various points within the interior of the glass near the surface. The crystals developed are randomly oriented and relatively small in size compared to most other crystallization techniques.

In copending application Ser. No. 325,496, filed Nov. 21, 1963 by Dale Rinehart, now abandoned, there is disclosed a method of developing surface crystallization to produce increased strength in glass. The crystals produced in this technique are surface nucleated by coating the glass with a titanium nucleating compound. The surface nucleated crystals grow from the surface into the glass interior to develop the lower coefficient of thermal expansion surface zone. The characteristic crystalline development is perpendicular to the glass surface and predominantly composed of parallel oriented needle shaped crystals.

Ultra-violet radiation has also been used to produce crystallization in certain glass compositions. These ultra-violet sensitive glasses are heat treated to develop crystalline photographic images in the glass. Such a technique is disclosed in U.S. Patent No. 2,515,941 issued to Stanley D. Stookey. The crystals in this technique are nucleated by photosensitization of gold in the glass. The crystal grown is barium disilicate. Closely related work by Stookey discloses silver and copper photo-sensitive glasses which develop crystals of various lithium compounds.

What has been discovered in the present invention is a method of producing randomly oriented surface and near surface silica-O crystals in glass by subjecting suitable base glass compositions to high energy radiation and subsequent heat treatments.

Broadly, the mechanisms in the present invention begin with a high energy irradiation treatment of a suitable glass to produce photo-electrons at metastable levels which are localized due to the high viscosity of the glass. The irradiated glass sample is then heat treated to cause the electrons to migrate to certain metal ions in the glass to reduce these metal ions to atomic metal. Some of these metal atoms coagulate into aggregates of colloidal size metal particles. A second heat treating operation alters the metal aggregates into crystal nuclei. The nucleated glass composition is then heat treated in a third operation to promote crystalline growth upon the nuclei so developed in the glass.

This invention more particularly relates to crystallizing silica-O in transparent or translucent lithia-soda-alumina-silicate glass compositions. The crystal, silica-O, developed is the same as that developed in the copending application of Jean Pressau referred to above. Strength improvement is developed in the present invention by the relatively low coefficient of thermal expansion exhibited by the silica-O crystal compared to the coefficient of thermal expansion exhibited by the base glass composition. Increased abraded strength of the glass samples is realized in the present invention due to the deep layer of crystallization which can be developed.

Silicia-O is the name given to a type of crystalline structure which is a polymorphic form of $SiO_2$. A discussion of the nature of the silica-O crystal form can be found in Zeitschrift fur Kristallographie, vol. III, pp. 185–189 (1959) by Rustum Roy. This form of $SiO_2$ exhibits a structure which is very similar to that of high quartz. The silica-O crystalline structure is *metastable at room temperature* but occurs commonly at this temperature.

The refractive index of silica-O has been determined to be about 1.53, but the index has no definite value because the measurement of refractive index is affected by normal variability in composition of the silica-O phase. This refractive index roughly matches the refractive index of the base glass of the present invention and makes the production of transparent crystallized glass articles possible.

The silica-O crystalline structure can be easily and conclusively identified by its powder diffraction pattern. Silica-O is distinguishable from other polymorphic forms of $SiO_2$ by the absence of $d$ spacings at about 3.85 angstroms and 3.17 angstroms. Table I presents powder X-ray data for the members of the silica-O series.

TABLE I

| hkl [1] | $SiO_2$ Richest in High Quartz $d$ Spacings in Angstroms | $I/I_0$ Relative Reflected Intensity | β-eucryptite $d$ Spacings In Angstroms | $I/I_0$ $SiO_2$ Most Deficient Relative Reflected Intensity |
|---|---|---|---|---|
| 100 | 4.32 | 40 | 4.55 | 22 |
| 101 | 3.38 | 100 | 3.53 | 100 |
| 110 | 2.498 | 10 | 2.634 | 10 |
| 102 | 2.303 | 5 | 2.384 | 3 |
| 200 | 2.165 | 18 | 2.274 | 9 |
| 201 | 2.013 | 12 | 2.105 | 8 |
| 112 | 1.842 | 60 | 1.914 | 38 |
| 202 | 1.696 | 3 | 1.763 | 3 |
| 211 | 1.568 | 25 | 1.643 | 24 |
| 212 | 1.404 | 20 | 1.463 | 11 |
| 203 | 1.393 | 35 | 1.441 | 16 |

[1] Based on simple quatz cell, without doubling of C axis found in β-eacryptite itself.

In the above table, the *hkl* integer notation defines a plane in the crystal structure to which the rest of the tabluated data refer. The $d$ spacing data in angstroms represents the distance between the parallel crystalline planes of the type described by the *hkl* notation.

$I/I_0$ represents the relative intenisty of the reflected, essentially monochromatic X-ray light beam used to analyze the crystal for each series of crystalline planes for which a $d$ spacing is determined. The crystal plane for which the maximum intensity of reflected radiation occurs is taken arbitrarily to be 100 percent and all other planes have their relative reflected intensity described as a percentage of the most highly reflecting crystalline plane. It denotes the intensity of the reflected radiation of the plane being investigated and $I_0$ denotes the arbitrary reflectivity standard of 100 percent.

The present method of producing strengthened glass articles begins with fabricating the glass into its final desired configuration by conventional glass forming techniques. Crystal nuclei are then developed in selected portions of the glass article through high energy irradiation and heat treatments. After the crystal nuclei have been developed, the glass article is further heat treated to promote crystalline growth on the crystal nuclei developed.

Some of the earlier crystallization methods related to crystalline growth which predominantly began at the surface of the glass. The number of crystals formed was usually low and generally of a preferential orientation with respect to the plane of the surface. The average crystal size produced was correspondingly relatively large compared to the crystals produced in the present invention.

A comparison of the crystalline structure developed in the present invention and the crystalline structure developed by a typical surface nucleated technique can be seen in the attached photographs (FIGURES 1 and 2) in which, FIGURE 1 is a photograph magnified 80× of the randomly oriented silica-O crystals developed in and near the surface of a glass article prepared in accordance with the teachings of the present invention and FIGURE 2 is a photograph magnified 80× of the needle-shaped predominantly unidirectional crystals characteristically formed from surface nucleation sites. The relative location of the surface and interior portions of each glass sample is indicated on each photograph.

Random crystalline orientation promotes the development of higher compressive stress than unidirectional crystalline orientation. This result is obtained because in a randomly oriented crystalline layer a higher percentage of the crystals are oriented in a direction such that the C axis is effectively parallel with the surface of the glass. The C axis of the silica-O crystal exhibits the lowest coefficients of thermal expansion of any of the three crystal axes. Surface nucleated crystals orient themselves such that the C axis of the crystal (lowest coefficient of thermal expansion) is perpendicular to the surface of the glass, which is the least desirable orientation to promote surface compressive stress.

It is also characteristic of the present invention that the number of individual crystals produced is large and are of a correspondingly smaller average size. The size of the crystals produced in accordance with the practice of the present invention vary from approximately 0.1 micron to 0.5 micron in size. The smaller crystal size is the direct result of the crystalline growth not being limited to growth only from surface nucleation sites. The size to which each crystal can grow before contacting another crystal is limited by the number of crystals being formed in that portion of the glass. The earlier the crystals contact each other during their growth, the smaller is the average size of each crystal developed. The development of a large number of small crystals in the surface of the glass article result in increased strength without substantially decreasing the transparency of the glass article. Moreover, the time required for crystallization is substantially reduced by limiting crystal size growth.

In the present invention control of the radiation and heat treatment operations promote a corresponding control over the percent crystallinity which can be developed in various portions of the glass article. The percent crystallinity developed in and near the surface can be as high as 100 percent or any degree less than that, by varying the total dose of the high energy radiation, and controlling the duration and temperatures of the heat treatments during nucleation and crystalline growth.

The exact mechanisms of the present invention are at the present time not fully understood. Our best, but still incomplete, understanding of the mechanism involved is expressed in the following model.

It is known that free electrons have relatively short ranges of penetration in matter even at high energy levels. Free electrons of an energy of 2 million electron volts have the ability to penetrate only about 2 millimeters into the surface of glass. Bombardment of a material with electrons at an energy level of 2 million electron volts produces heavy ionization in the irradiated material, with especially high and heavy ionization intensity near the end of the penetration range. At these high energy levels, electrons are able to ionize any atoms which may be present in the bombarded material.

In the case of glass, oxide ions bombarded by high ion to form atomic silver or with trivalent cerium ion to form pseudo-cerous ion. If other metals such as gold, copper or platinum are present in the glass they behave similarly to the silver upon being irradiated and heated. During the first relatively low-temperature heat treatment of the present invention, the distribution of the electrons in the color center trapping sites is disturbed. The color center traps being the least stable are completely emptied of their electrons and decay away. The reduced metal such as atomic silver probably undergoes competing processes of (A) emptying and (B) coalescence by diffusion to form stable particles of colloidal silver. The exact role played by cerium in the glass is not clear. It is theorized secondary electrons, it is believed, are trapped in metastable states to form color centers. Other secondary electrons combine with metal ions in the glass such as silver of a glass. It is believed that most of these secondary electrons recombine, producing no net effect. Some of the energy electrons probably furnish a great many secondary electrons since they occupy most of the volume that the pseudo-cerous ions contribute to the formation of atomic silver by reducing silver ions during the heat treatment.

There is also the possibility that little or no atomic silver except that formed by the reaction of the pseudo-cerous ions with the silver ion exists in the glass. This reaction takes place between 200 and 300° C.

The presence of atomic silver in the glass composition is preferred as compared to metals such as gold, copper or platinum but silver alone is not sufficient to produce the proper environment for nucleation of silica-O crystals in the glasses of the present invention.

To develop the proper nucleation sites for the silica-O crystal using the preferred compositions of the present invention requires the presence of titanium dioxide between about 1.5 percent and 3.0 percent by weight compared to the total weight of the composition. The nucleation also does not occur until a temperature of about 647° C. is established in the glass. It is theorized that in nucleation the silver-glass interface promotes the separation of a titania-rich glass phase immediately around the coagulated reduced silver atoms which in turn acts as the nucleus for the silica-O crystal. It is thought that each silver particle becomes embedded in a spherical globule of titania rich glass, perhaps 1000 angstroms in diameter during the second heat treatment of the present invention, referred to as the nucleating heat treatment phase of the invention. The silver may, in fact, dissolve in this globule at this time.

When the temperature is further raised to approximately 720° C. it is theorized that the titania globule suddenly crystallizes and triggers the growth of a single crystal of silica-O about itself. At this higher temperature the growth of the crystal continues until the heating is discontinued or until the crystals begin to contact each other, whichever occurs first.

X-ray irradiation is observed to produce qualitatively the same effects as high energy electron irradiation. The available dose rates possible, however, using presently available equipment are lower by a factor of 100 to 1000 times, necessitating longer irradiation times than required when using electron irradiation equipment such as the Van de Graaff generator. The depth of the X-ray irradiation penetration into the glass is generally greater than that of the electron penetration. X-rays from a tungsten target, for example, will sensitize a ½ inch thick glass sample completely throughout its thickness. Copper target X-ray sources penetrate only about ½ millimeter and molybdenum target X-ray sources allow penetration somewhere between the tungsten and copper penetrations. Ultra-violet radiation may also be used in accordance with the technique herein presented.

The invention is further described in the following detailed examples:

EXAMPLE I

A glass having the following calculated composition was prepared:

| Component: | Percent by weight |
| --- | --- |
| $SiO_2$ | 55.76 |
| $Al_2O_3$ | 27.29 |
| $MgO$ | 3.78 |
| $Li_2O$ | 5.17 |
| $Na_2O$ | 8.00 |
| $TiO_2$ | 1.50 |
| $AgNO_3$ | 0.17 |
| $CeO_2$ | 0.05 |

A 900 gram batch of the glass forming raw materials was melted in a clay crucible at a temperature of 1500° C. for approximately five hours. The melted glass was removed from the furnace and quenched in water to form small glass particles. These small glass particles were then remelted in a platinum crucible for a period of two hours at 1500° C. After two hours of melting at 1500° C., the glass was stirred with a platinum rod at 35 rotations per minute for an additional two hours. After the additional two hour stirring period the glass was allowed to fine for two more hours at 1500° C.

At the completion of the melting procedure described above, the temperature of the glass was lowered 25° C. and allowed to stand for a period of ten minutes. The glass was then poured out of the platinum crucible into rectangular shaped cast iron plate molds to form plates of glass approximately ½ inch thick. The plates of glass were then placed in an oven at a temperature of 550° C. with the power turned off, and allowed to cool for a period of eleven hours down to room temperature. The glass plates were then removed from the oven and cut into pieces 3⅛ inches square by about ½ inch thick. The surfaces of the glass plates were then ground and polished using conventional techniques.

The larger surfaces (3⅛ inches square) of one of the glass samples were then exposed to bombardment with high energy electron radiation from a Van de Graaff generator. The irradiated surfaces were exposed to 20 megarads of electron radiation at 1 Million Electron Volts energy level. The control glass plate sample was not irradiated.

The irradiated and the control (unirradiated) samples were then heated in an oven for one hour at 400° C. The temperature of both samples was then raised to 647° C. and maintained at that temperature for a period of two hours. The samples were then raised further in temperature to 720° C. for a period of 15 minutes. The samples were then removed from the heat treating oven and placed in another oven at 500° C. The oven was turned off and allowed to cool overnight during which time the samples cooled to room temperature.

The irradiated and the control samples were then cut into thin sections and examined under a polarizing microscope using crossed nicols to determine the extent of crystallization produced in each glass sample.

Examination of the irradiated glass plate sample revealed a deep crystallized layer approximately one millimeter thick immediately beneath each irradiated surface. The control sample prepared and treated in the identical manner except for the irradiation treatment was observed to have a crystallized surface layer approximately 40 microns thick. Comparison of the control sample and the irradiated sample demonstrates the much greater depth of crystallization possible using the irradiation technique.

The irradiated sample was translucent and white in appearance. The control sample was similar in appearance except that it was slightly more transparent and did not contain as much crystalline growth.

EXAMPLE II

In Table II, entitled "Compositions," are listed a series of calculated glass compositions which can be crystallized according to the teachings of the present invention.

Glass melts, of 900 grams each, of the compositions A through N indicated above were prepared. The melts were each made by placing the raw batch materials in a

TABLE II.—COMPOSITIONS

[All samples contain $SiO_2$, 55.76 percent; $Al_2O_3$, 27.29 percent; MgO, 3.78 percent and $Li_2O$, 5.17 percent. All percents are by weight]

| | A | B | C | D | E | F | G | H | I | J | K | L | M | N |
|---|---|---|---|---|---|---|---|---|---|---|---|---|---|---|
| Other Ingredients: | | | | | | | | | | | | | | |
| $Na_2O$ | 8.00 | 4.0 | 8.00 | 7.0 | 8.0 | 8.00 | 8.00 | 8.00 | 8.00 | 8.00 | 4.0 | 7.0 | 8.0 | 8.0 |
| $K_2O$ | | 4.0 | | | | | | | | | 4.0 | | | |
| $TiO_2$ | 1.5 | 1.5 | 1.75 | 1.25 | 1.25 | 1.5 | 1.5 | 1.5 | 1.5 | 1.5 | 1.5 | 1.25 | 1.75 | 1.5 |
| $AgNO_3$ | 0.17 | 0.17 | 0.17 | 0.17 | 0.17 | 0.17 | 0.17 | 0.17 | 0.02 | 0.17 | 0.17 | 0.20 | 0.20 | 0.20 |
| $Sb_2O_3$ | 1.00 | | | 1.00 | 3.00 | | | 1.00 | | 1.00 | 1.00 | 1.00 | | 1.00 |
| $CeO_2$ | | | 0.05 | 0.05 | | | | | | 0.05 | | 0.05 | | |
| NaF | | | | | 1.00 | | | | | | 1.00 | | | |
| $P_2O_5$ | | | | | | 6.00 | | | | | | | | |
| $MnO_2$ | | | | | | | | | | 0.30 | | | | |
| $SnO_2$ | | | | | | | | | 0.025 | | | | | |
| $V_2O_5$ | | | | | | | 0.20 | | | | | | | |
| $Fe_2O_3$ | | | | | | 0.09 | | | 0.30 | | | | | | silica pot and heating the pot in an electric furnace. The furnace was maintained at a constant temperature of 1550° C. and each melt was heated in the furnace for 2½ hours. The silica pot was then removed from the furnace and the molten glass was quenched by pouring into cold water. The quenched glass particles were then dried on a hot plate for 15 minutes at a temperature of 100° C. After drying, the glass particles were placed in a platinum crucible. The platinum crucible in turn was placed in a silica pot and both crucibles were then placed in a furnace at a temperature of 1550° C. After ½ hour, mechanical stirring of the glass was begun utilizing a platinum stirring rod. The stirring was conducted at 33 rotations per minute (r.p.m.) for a period of 2 hours. The rate of stirring wass then decreased about 2 r.p.m. per minute for approximatelly 15 to 16 minutes and stopped. The molten glass was then maintained an additional 15 minutes at 1500° C.

The molten glass was removed from the furnace and poured into metal molds preheated to 600° C. The molds produced samples 3½ inches in outside diameter by about ½ inch thick.

After the temperature of the glass in the molds had cooled to about 600° C., the samples were removed from the molds and placed in an annealing furnace at a temperature of 600° C. The power of the annealing furnace was turned off and the glass was allowed to cool overnight in the furnace to room temperature.

The glass samples were then ground and polished, using conventional techniques, until they were ⅜ of an inch thick and 3.4 inches in diameter.

The samples of each composition were then separated into two groups. Approximately ½ of the samples were used as the control samples and thus were not subjected to any radiation treatment. The other half were irradiated as indicated in Table II.

The irradiated samples were subjected to the electron beam of a Van de Graff generator. The different dose rates and different electron energies used are those indicated in Table II. These samples were irradiated on all exposed surfaces, top, bottom, and the edges. After irradiation, the samples exhibited varying degrees of induced brownish color.

Both the controls and the irradiated samples were then identically heat treated. Each sample was heated in successive steps for one hour at 400° C., two hours at 647° C. and 15 minutes at 720° C. This was accomplished by having 3 electrically heated furnaces close to each other at 400° C., 647° C., and 720° C., respectively. The samples were subjected to a heat treatment and then transferred as rapidly as possible to the next furnace to conduct the next heat treatment. After each sample had been subjected to the three different heat treatments, it was returned to a furnace at 647° C. at which time the power was turned off. The furnace was then allowed to cool to room temperature over a period of about 16 hours. After all the samples had been heat treated and cooled, they were surface abraded.

The abrading apparatus consisted of a circular sample support, a tubular shaped shield which protected the glass sample from the abrasive except for a circular area in the center of the sample ¾ of an inch in diameter, a tube through which the abrasive mixture and air under pressure was introduced onto the unprotected portion of the glass sample, and a funnel positioned within the tubular transmitting cylinder. The samples were abraded by allowing a jet of compressed air to be introduced into the tubular cylinder to accelerate the sand placed in the funnel and to drive the sand onto the glass sample.

The abrasive used was 2 cubic centimeters of Hancock Sand obtained from the Pennsylvania Glass Sand Companyl, 603 Stanwix Street, Pittsburgh, Pa. The sand used passed through the standard Tyler 28 mesh screen but was retained on the standard Tyler 35 mesh screen. The sand was introduced into the funnel and was driven onto the glass sample by an air jet at 50 pounds per square inch. The sand is poured into the funnel by hand and takes only a second or two to be driven onto the glass sample. The abrasion produced removes approximately two-thousandths of an inch of glass. A frosted circular area develops on the glass specimen where it is abraded. All samples were abraded using the technique just described.

The samples were then tested utilizing a concentric ring load test. Each sample was placed on a three-inch support ring, and a 1½ inch ring was placed on top in the approximate center of the abraded area. The samples were loaded by raising the bottom concentric ring at a constant rate against the sample held in place by the upper ring. The load was applied at a uniform rate which developed a stress of approximately 1,000 pounds per square inch per minute in the sample.

The irradiated test samples consistently showed two or three times the modulus of rupture strength exhibited by the un-irradiated samples. The un-irradiated control sample of Composition G exhibited an abraded strength of 2,000 pounds per square inch while the irradiated sample exhibited an abraded strength of 33,000 p.s.i. This constitutes over a 16 fold improvement in the abraded strength. It was also noted in the testing that the irradiated samples exhibited a tempered break pattern, producing small, roughly cubical shaped glass fragments. The techniques of the present invention therefore develop increased abraded modulus of rupture strength in glass and also a reduced danger of injury when failure of the glass does occur, due to the tempered break pattern exhibited.

The penetration depth of crystallization in the present invention depends upon the penetration depth to which crystal nucleation is developed. The penetration depth of crystal nucleation in turn depends upon the energy level of the exciting radiation. Since the energy level of the exciting radiation can be controlled over a wide range, this results in a corresponding wide range control over the depth of crystallization developed in the present invention. The improved abraded strengths realized using the surface crystallization technique of the present invention is due to the greater depth of control crystalline growth possible using the high energy radiation technique.

To obtain comparable depths of crystallization using the known techniques requires growing larger crystals. The larger crystals exhibit high light scattering characteristics which tends to impair the transparency of the crystallized glass article. The larger crystal also tends to develop articles exhibiting lower strengths.

The times and temperatures employed in the heat treatments present in the examples above are not the only ones which can be used. If the composition is modified, the nucleation and crystalline growth optimum temperatures of the glass will also change.

Although silver has been used extensively in the glass compositions herein disclosed other metals such as gold, copper and platinum can be used in place of part or all of the silver content with similar results. Various mixtures of these metals can also be used.

If silver is selected as the metal to be used of those listed, the silver content of the glass may vary from about 0.1 to 0.6 percent by weight and still enable the desirable number of crystal nuclei to be developed.

I claim:
1. A method of producing a substantially transparent strengthened glass article having a substantially crystalline surface layer at and immediately subjacent the surface of said article and a substantially non-crystalline layer subjacent to said crystalline layer from an article of a crystallizable glass of the family of lithia-alumina-silica glasses which forms silica-O crystals having a lower coefficient of thermal expansion than said glass and contains from about 0.1 to about 0.6 percent by weight of a metal selected from the group consisting of gold, silver, copper and platinum, and mixtures thereof, comprising
   (A) irradiating said crystallizable glass article throughout the surface thereof wherein silica-O crystallinity will result with high-energy radiation having an energy level sufficient to penetrate said glass article for only a short distance below the surface of said article and for a period of time sufficient to reduce metal ions of gold, silver, copper and platinum present in the surface and the region subjacent thereto to their respective metalic form,
   (B) heating said glass article at a temperature and for a period of time sufficient to promote the coagulation of said reduced metal ions in and subjacent the surface of said article and the formation of nuclei,
   (C) heating said glass article at a higher temperature and for a period of time sufficient to develop randomly-oriented silica-O crystals on the nuclei so developed, and
   (D) cooling said glass article whereby to provide a substantially transparent strengthened glass article having randomly-oriented silica-O crystals at and subjacent the surface of said article and a non-crystalline glassy zone subjacent said crystalline layer, and possessing a high modulus of rupture strength and high abrasion resistance.

2. The method of claim 1 in which the crystalline form developed is silica-O.

3. The method of claim 1 in which the high energy radiation is electron radiation produced by a Van de Graaff generator.

4. The method of claim 1 in which the high energy radiation is electron radiation of a total dose from 2 to 20 megarads and whose energy level is from 0.5 to 5.0 mev.

5. The method of claim 1 in which the high energy radiation is X-ray radiation.

6. The method of claim 1 in which the high energy radiation is ultra-violet radiation.

7. The method of claim 1 in which the glass consists in its essential ingredients in percent by weight of 53 to 58 percent $SiO_2$, 25 to 29 percent $Al_2O_3$, 4 to 6 percent $Li_2O$, 2 to 5 percent MgO, 1 to 2 percent $TiO_2$, 0 to 3 percent NaF, .1 to .6 percent $AgNO_3$, 0.025 to 0.05 percent $CeO_2$, 0 to 3.0 percent $Sb_2O_3$, and a viscosity controlling agent selected from the group consisting of 4 to 8 percent $Na_2O$, 0 to 6 percent $K_2O$, mixtures of $Na_2O$ and $K_2O$ not exceeding about 10 percent, 0 to 7 percent $P_2O_5$ and mixtures of $Na_2O$ and $P_2O_5$, $K_2O$ and $P_2O_5$, and $Na_2O$, $K_2O$, and $P_2O_5$ in the stated amounts not exceeding about 14 percent.

8. The method of claim 1 in which the base glass composition consists essentially in percent by weight of 55.76 percent $SiO_2$, 27.29 percent $Al_2O_3$, 3.78 percent MgO, 5.17 percent $Li_2O$, 4 to 8 percent $Na_2O$, 0 to 3 percent NaF, 0 to 6 percent $K_2O$, 1 to 2 percent $TiO_2$, 0.1 to 0.6 percent $AgNO_3$, 0.025 to 0.05 percent $CeO_2$, and 0 to 0.5 percent $Sb_2O_3$.

9. The method of claim 1 wherein the crystallizable glass base contains from about 1.5 to about 3.0 percent by weight of $TiO_2$.

References Cited

UNITED STATES PATENTS

| | | | |
|---|---|---|---|
| 2,515,937 | 7/1950 | Stookey | 65—66 XR |
| 2,971,853 | 2/1961 | Stookey | 65—33 XR |
| 2,515,940 | 7/1950 | Stookey. | |
| 3,146,114 | 8/1964 | Kivlighn | 63—33 XR |
| 3,148,994 | 9/1964 | Voss | 65—33 XR |
| 3,161,528 | 12/1964 | Eppler | 65—33 XR |
| 3,282,770 | 11/1966 | Stookey et al. | 65—33 XR |

OTHER REFERENCES

"Infrared Study of Compounds and Solid Solutions in the System Lithia-Alumina-Silica" by M. Krishna Murthy and Elizabeth M. Kirby, April 26, 1961, pp. 324 and 325.

"Phase Separation Induced by Platinum in Sodium Phosphate Melts" by Rindone and Ryder, January 1957, pp. 29 to 31 and 51.

"Influence of Platinum Nucleation on Crystallization of a Lithium Silicate Glass by Guy E. Rindone, January 1958, pp. 41 and 42.

S. LEON BASHORE, *Acting Primary Examiner.*

F. W. MIGA, *Assistant Examiner.*

U.S. Cl. X.R.

65—30; 106—39